(12) United States Patent
Lee et al.

(10) Patent No.: US 9,819,085 B2
(45) Date of Patent: Nov. 14, 2017

(54) NFC ANTENNA MODULE AND PORTABLE TERMINAL COMPRISING SAME

(71) Applicant: AMOTECH CO., LTD., Incheon (KR)

(72) Inventors: Chi-Ho Lee, Incheon (KR); Hyung-Il Baek, Gyeonggi-do (KR); Beom-Jin Kim, Gyeonggi-do (KR); Jin-Won Noh, Gwangju (KR); Jong-Ho Park, Jeollabuk-do (KR)

(73) Assignee: Amotech Co., Ltd., Incheon (KR)

( * ) Notice: Subject to any disclaimer, the term of this patent is extended or adjusted under 35 U.S.C. 154(b) by 0 days.

(21) Appl. No.: 14/891,188

(22) PCT Filed: May 13, 2014

(86) PCT No.: PCT/KR2014/004268
§ 371 (c)(1),
(2) Date: Jan. 29, 2016

(87) PCT Pub. No.: WO2014/185687
PCT Pub. Date: Nov. 20, 2014

(65) Prior Publication Data
US 2016/0134019 A1    May 12, 2016

(30) Foreign Application Priority Data
May 13, 2013   (KR) .................. 10-2013-0053677

(51) Int. Cl.
*H01Q 7/00* (2006.01)
*H01Q 7/06* (2006.01)
*H01Q 1/24* (2006.01)
*H04B 5/00* (2006.01)

(52) U.S. Cl.
CPC ............. *H01Q 7/06* (2013.01); *H01Q 1/243* (2013.01); *H01Q 7/00* (2013.01); *H04B 5/0031* (2013.01)

(58) Field of Classification Search
CPC ............ H01Q 7/08; H01Q 7/06; H01Q 1/273; H01Q 1/38
USPC ........................................ 343/866, 788, 842
See application file for complete search history.

(56) References Cited

U.S. PATENT DOCUMENTS

2005/0040997 A1* 2/2005 Akiho .................. G06K 7/0008
343/866
2015/0303561 A1* 10/2015 Yang .................... H01Q 1/2266
343/842

FOREIGN PATENT DOCUMENTS

| CN | 103022661 A | 4/2013 |
| JP | 2012-195647 A | 10/2012 |
| KR | 10-2006-0112051 A | 10/2006 |
| KR | 10-2007-0120717 A | 12/2007 |

(Continued)

*Primary Examiner* — Dameon E Levi
*Assistant Examiner* — Collin Dawkins
(74) *Attorney, Agent, or Firm* — Baker & Hostetler (57) ABSTRACT

Disclosed are a NFC antenna module which maximizes antenna performance by mounting a radiation sheet in such a manner as to partially overlap with an antenna sheet and a portable terminal comprising the same. The disclosed NFC antenna module comprises: an electromagnetic wave shielding sheet; an antenna sheet laminated on the electromagnetic wave shielding sheet and having a radiation pattern formed along the outer periphery of a central portion thereof; and a radiation sheet laminated on the antenna sheet so as to form an overlapping area with the radiation pattern and having a recess formed therein, through which the central portion is exposed.

9 Claims, 7 Drawing Sheets

(56) References Cited

FOREIGN PATENT DOCUMENTS

| KR | 10-2009-0126323 A | 12/2009 |
|---|---|---|
| KR | 10-1098263 B1 | 12/2011 |
| KR | 10-2012-0080929 A | 7/2012 |
| KR | 10-2012-0103297 A | 9/2012 |
| KR | 10-2012-0103300 A | 9/2012 |
| WO | 2010/122888 A1 | 10/2010 |

* cited by examiner

FIG. 7

NFC ANTENNA MODULE AND PORTABLE TERMINAL COMPRISING SAME

TECHNICAL FIELD

The present invention generally relates to a Near-field Communication (NFC) antenna module and, more particularly, to an NFC antenna module that is embedded in a portable terminal to communicate with NFC antenna modules embedded in other portable terminals, and to a portable terminal having the NFC antenna module.

This application is a National Stage of International patent application PCT/KR2014/004268, filed on May 13, 2014, which claims the benefit of Korean Patent Application No. 10-2013-0053677, filed May 13, 2013, which is hereby incorporated by reference in its entirety into this application.

BACKGROUND ART

With technological advances, portable terminals, such as a mobile phone, a Personal Digital Assistant (PDA), and a Portable Multimedia Player (PMP), a navigation system, and a laptop, are equipped to additionally provide short-range communication between devices, such as Digital Multimedia Broadcasting (DMB) and the wireless Internet, in addition to basic functions such as calling, playing video/music, and navigation. Accordingly, portable terminals are equipped with a plurality of antennas for wireless communication, such as wireless Internet and Bluetooth.

Further, recently, functions such as information exchange between terminals, payment, ticket booking, and searching using short-range communication (that is, NFC) have been applied to portable terminals. To this end, portable terminals are equipped with an antenna module (that is, an NFC antenna module) used for local communication. The NFC antenna module is a non-contact short-range wireless communication module, which uses Radio Frequency Identification (RFID) in a frequency band of about 13.56 Hz, and transmits data between terminals at short distances of about 10 cm. NFC is used in various areas such as the transmission of product information in supermarkets or stores, the transmission of travel information for visitors, traffic control, access control, and locking systems, in addition to payment.

Recently, markets for portable terminals such as tablet PCs and smart phones have rapidly extended. Portable terminals have a tendency to include functions, such as information exchange, payment, ticket booking, and searching, which use short-range communication (i.e. NFC). Accordingly, the demand for NFC antenna modules for use in short-range communication has increased.

In portable terminals, differential antenna type-NFC antenna modules are chiefly used. Such a differential antenna type-NFC antenna module receives signals from an external terminal through a radiator pattern and transfers signals only through a signal line connected to an end portion of the first side of the radiator pattern. Accordingly, since the strength of a signal received by a conventional NFC antenna module is weak, a problem arises in that reception performance in a reader mode is deteriorated and the recognition distance in the reader mode is shortened.

DISCLOSURE

Technical Problem

The present invention has been proposed to solve the above conventional problems, and an object of the present invention is to provide an NFC antenna module, in which a radiation sheet is mounted to overlap part of an antenna sheet, thus maximizing antenna performance, and to provide a portable terminal having the NFC antenna module.

Technical Solution

To accomplish the above object, a Near-Field Communication (NFC) antenna module according to an embodiment of the present invention includes an electromagnetic shielding sheet; an antenna sheet in which a radiation pattern is formed along a peripheral surface of a central part, the antenna sheet being stacked on the electromagnetic shielding sheet; and a radiation sheet stacked on the antenna sheet to form an area that overlaps the radiation pattern, the radiation sheet having a depression formed to expose the central part. Here, the radiation sheet may form an area that overlaps a left pattern, a right pattern, and a lower pattern of the radiation pattern.

The radiation sheet may include a first protrusion formed on a left side of the depression and configured to form an area that overlaps a left pattern of the radiation pattern; a second protrusion formed on a right side of the depression and configured to form an area that overlaps a right pattern of the radiation pattern; and a base element formed under the depression and configured to form an area that overlaps a lower pattern of the radiation pattern. Here, the base element may be configured such that one or more slots for exposing part of the lower pattern are formed in the area that overlaps the lower pattern.

The radiation sheet may include a first radiation sheet including the first protrusion and part of the base element, and forming an area that overlaps the left pattern and the lower pattern of the radiation pattern; and a second radiation sheet including the second protrusion and remaining part of the base element, and forming an area that overlaps the right pattern and the lower pattern of the radiation pattern. Here, the first radiation sheet and the second radiation sheet may be spaced apart from each other by a separation space in the area that overlaps the lower pattern, and the lower pattern of the radiation pattern is exposed to outside through the separation space.

The radiation sheet may include a first protrusion formed on a left side of the depression and configured to form an area that overlaps a left pattern of the radiation pattern; a second protrusion formed on a right side of the depression and configured to form an area that overlaps a right pattern of the radiation pattern; and a base element formed under the depression, and configured to expose a lower pattern of the radiation pattern. Here, the radiation sheet may include a first radiation sheet including the first protrusion and part of the base element, and forming an area that overlaps the left pattern of the radiation pattern; and a second radiation sheet including the second protrusion and remaining part of the base element, and forming an area that overlaps the right pattern of the radiation pattern, wherein the first and second radiation sheets may be spaced apart from each other.

The electromagnetic shielding sheet may include a ferrite sheet.

Advantageous Effects

In accordance with the present invention, the NFC antenna module is advantageous in that a radiation sheet made of a metal material is stacked on the top of a radiation pattern to overlap the radiation pattern, so that the radiation from the radiation pattern is also performed through the radiation sheet, thus maximizing antenna performance.

Further, the NFC antenna module is advantageous in that slots are formed in part of the area of the radiation sheet that overlaps the radiation pattern, so that the area of the radiation sheet is reduced while antenna performance is maximized, thus reducing the unit cost.

BEST MODE

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Figure 1:
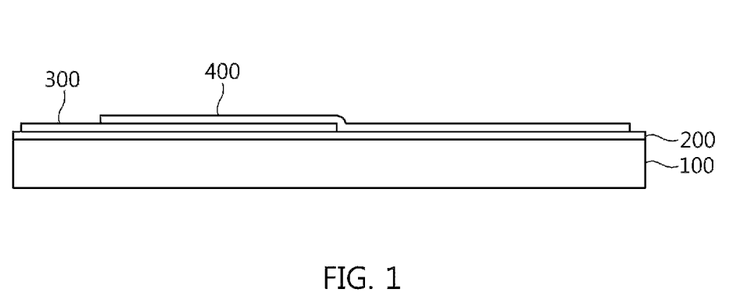
FIG. 1 is a diagram showing an NFC antenna module according to an embodiment of the present invention.
Figure 2:
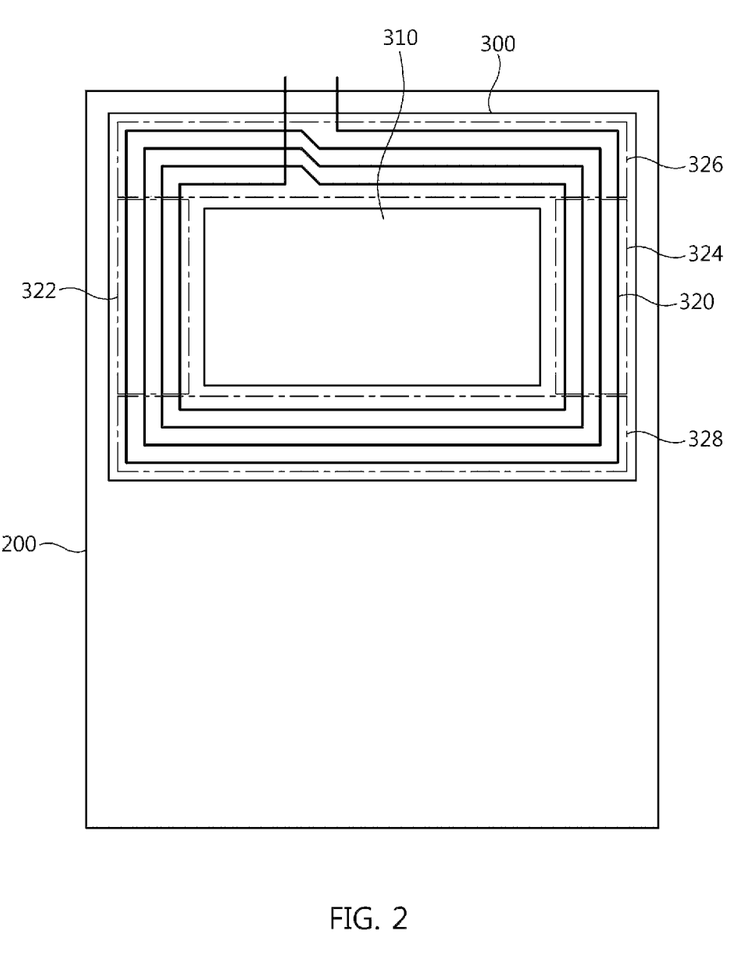
FIG. 2 is a diagram showing the antenna sheet of FIG. 1.

FIG. 1 is a diagram showing an NFC antenna module according to an embodiment of the present invention, FIG. 2 is a diagram showing the antenna sheet of FIG. 1, and FIGS. 3 to 7 are diagrams showing the radiation sheet of FIG. 1.

As shown in FIG. 1, an NFC antenna module is configured to include an electromagnetic shielding sheet 200, an antenna sheet 300, and a radiation sheet 400. Here, in FIG. 1, the NFC antenna module is shown as being mounted on the battery pack 100 of a portable terminal, but may be mounted on the rear housing (not shown) of the portable terminal.

The electromagnetic shielding sheet 200 is implemented as a sheet made of an electromagnetic shielding material, such as a ferrite sheet. The electromagnetic shielding sheet 200 is mounted on the first surface of the battery pack 100 for supplying driving power to the portable terminal. Of course, the electromagnetic shielding sheet 200 may also be mounted on the rear housing (not shown) of the portable terminal.

The electromagnetic shielding sheet 200 is formed to cover all or part of the first surface of the battery pack 100. Accordingly, the electromagnetic shielding sheet 200 is formed to have an area that is less than or equal to that of the first surface of the battery pack 100.

The antenna sheet 300 is stacked on one surface of the electromagnetic shielding sheet 200. That is, the antenna sheet 300 is stacked on the second surface of the electromagnetic shielding sheet 200, which is opposite to the first surface of the electromagnetic shielding sheet 200 which is in contact with the battery pack 100. Here, as shown in FIG. 2, the antenna sheet is implemented as a Flexible Printed Circuit Board (FPCB), and a radiation pattern 320, which resonates in an NFC frequency band, is formed on the first surface of the FPCB. Here, the radiation pattern 320 is formed in the shape of a loop in which a wire is wound several times around a central part 310 along the peripheral surface of the central part 310. Both ends of the radiation pattern 320 are connected to a feeder end (not shown) of the portable terminal through terminals (not shown) formed in the antenna sheet. Here, to easily describe the embodiment of the present invention, the radiation pattern 320 will be described as being divided into a left pattern 322, a right pattern 324, an upper pattern 326, and a lower pattern 328.

The antenna sheet 300 is arranged to be biased on the first side of the first surface of the electromagnetic shielding sheet 200. That is, the antenna sheet is arranged to be biased on one of the upper side, the lower side, the left side, and the right side of the first surface of the electromagnetic shielding sheet 200. Here, the antenna sheet 300 is formed to have an area less than or equal to the area of the electromagnetic shielding sheet 200.

The radiation sheet 400 is made of a metal material and is stacked on one surface of the antenna sheet 300. That is, the radiation sheet 400 is stacked on the second surface of the antenna sheet 300, which is opposite to the first surface of the antenna sheet 300 that is in contact with the electromagnetic shielding sheet 200. Here, the radiation sheet 400 partially overlaps the radiation pattern 320 formed on the antenna sheet 300 to form an overlapping area. The radiation sheet 400 may act as an auxiliary radiator while coming into contact with the radiation pattern 320 in the overlapping area, or may act as an auxiliary radiator due to a coupling effect while being spaced apart from the radiation pattern 320 by a predetermined distance.

Figure 3:
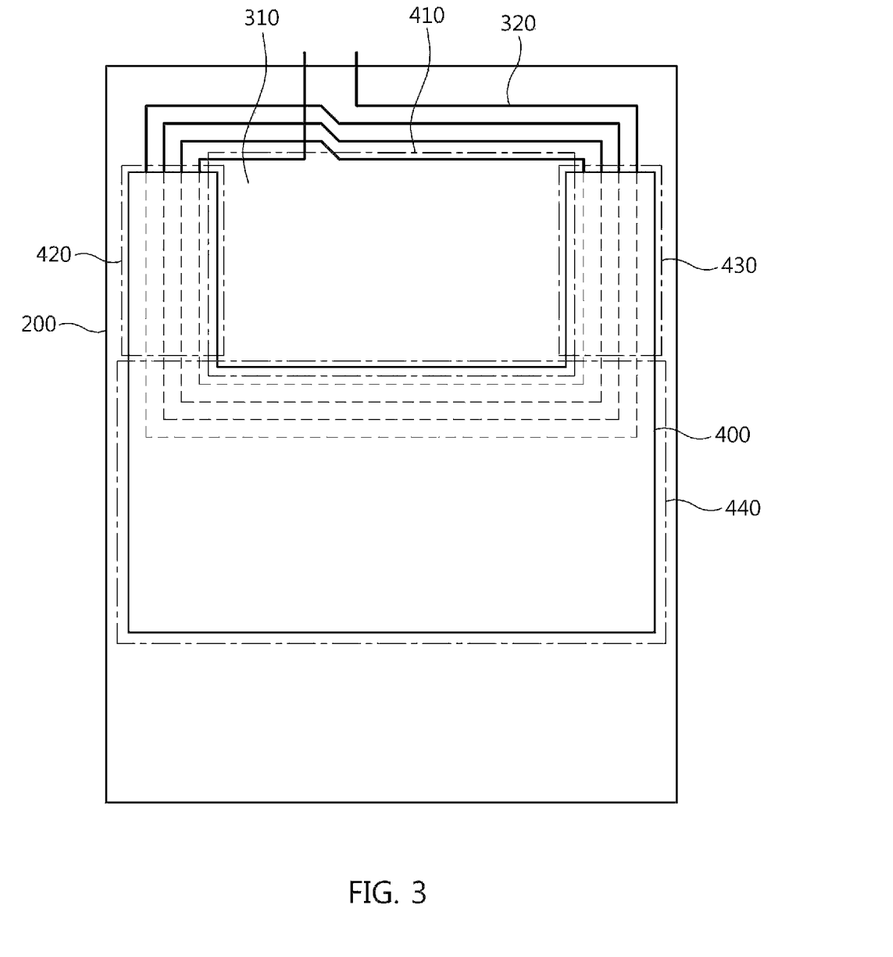
FIGS. 3 to 7 are diagrams showing the radiation sheet of FIG. 1.

As shown in FIG. 3, a rectangular depression 410 is formed in a portion of the radiation sheet 400 to expose the central part 310 of the antenna sheet 300. In the radiation sheet 400, a first protrusion 420 is formed on the left side of the depression 410, a second protrusion 430 is formed on the right side of the depression 410, and a base element 440 is formed under the depression 410. The radiation sheet 400 is formed in a U-shape, the base element 440 forms an area that overlaps the lower pattern 328 of the radiation pattern 320, the first protrusion 420 forms an area that overlaps the left pattern 322 of the radiation pattern 320, and the second protrusion 430 forms an area that overlaps the right pattern 324 of the radiation pattern 320. Accordingly, the radiation sheet 400 acts as an auxiliary radiator for the radiation pattern 320, whereby the area of radiation is increased, and antenna performance may be maximized thanks to the increase in the radiation area.

Figure 4:
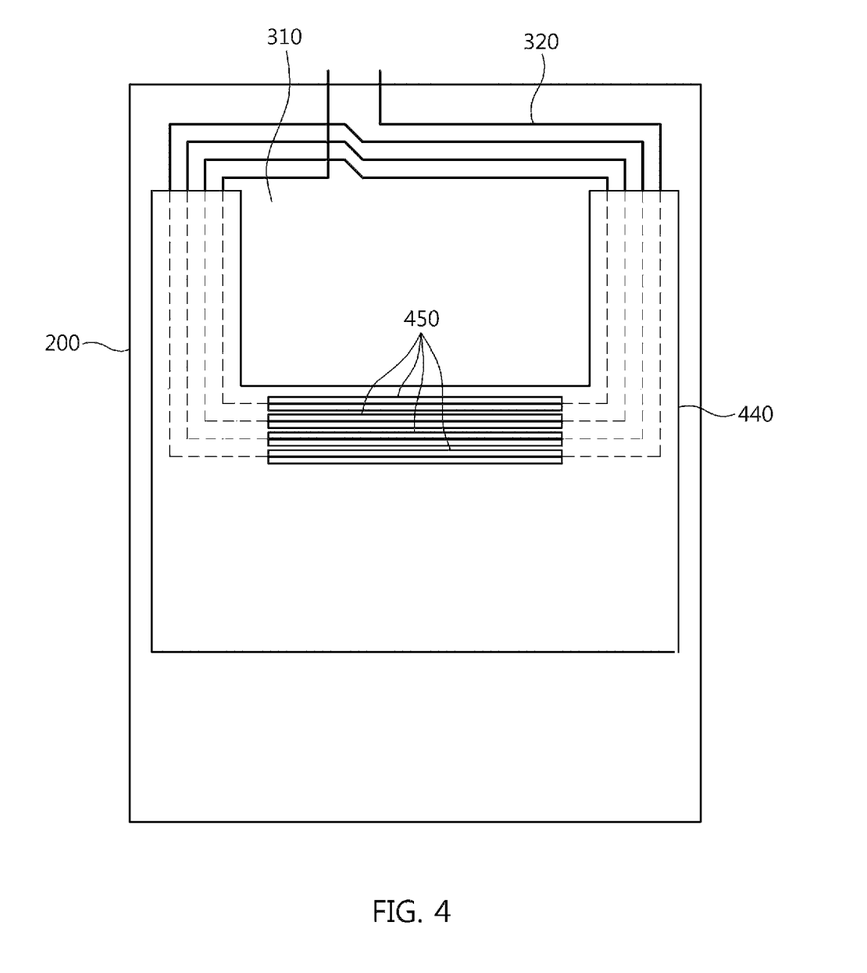

In this case, as shown in FIG. 4, in the radiation sheet 400, one or more slots 450 may be formed in the base element 440. That is, the base element 440 is configured such that multiple slots 450 are formed in the area that overlaps the lower pattern 328 of the radiation pattern 320. Accordingly, part of the lower pattern 328 is exposed through the multiple slots 450. By means of this structure, the area of the radiation sheet 400 may be reduced while antenna characteristics identical to those of the NFC antenna module, to which the radiation sheet 400 shown in FIG. 3 is applied, may be maintained, thus reducing the unit cost.

Figure 5:
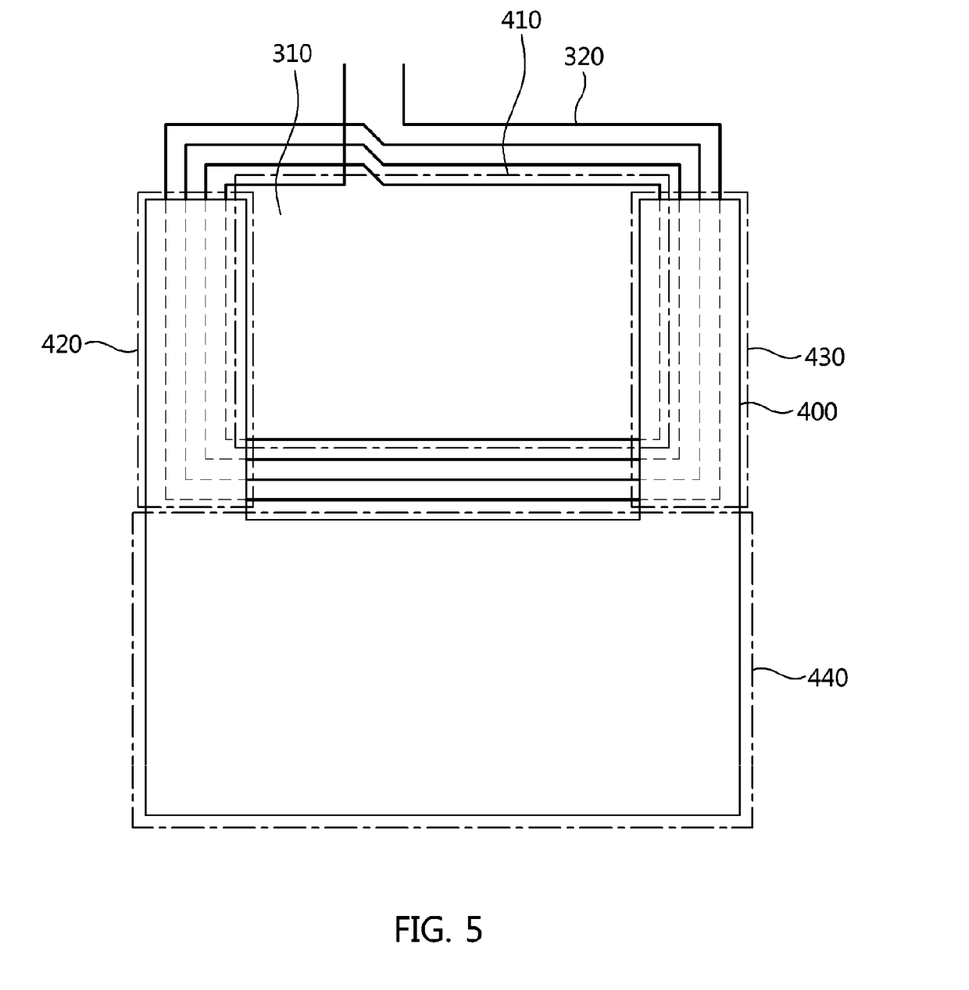

In the radiation sheet 400, an overlapping area may be formed only on both side patterns (i.e. the left pattern 322 and the right pattern 324) of the radiation pattern 320. That is, as shown in FIG. 5, the rectangular depression 410 is formed in a portion of the radiation sheet 400, and then the radiation sheet 400 is formed in a U-shape, whereby the first protrusion 420 and the second protrusion 430 form an area that overlaps the left pattern 322 and the right pattern 324 of the radiation pattern 320, and the base element 440 is formed to be spaced apart from the lower pattern 328. Accordingly, the central part 310 and the lower pattern 328 of the antenna sheet 300 are exposed through the depression 410. By means of this structure, the area of the radiation sheet 400 may be reduced while antenna characteristics identical to those of the NFC antenna module, to which the radiation sheet 400 shown in FIG. 4 is applied, may be maintained, thus reducing the unit cost.

Figure 6:
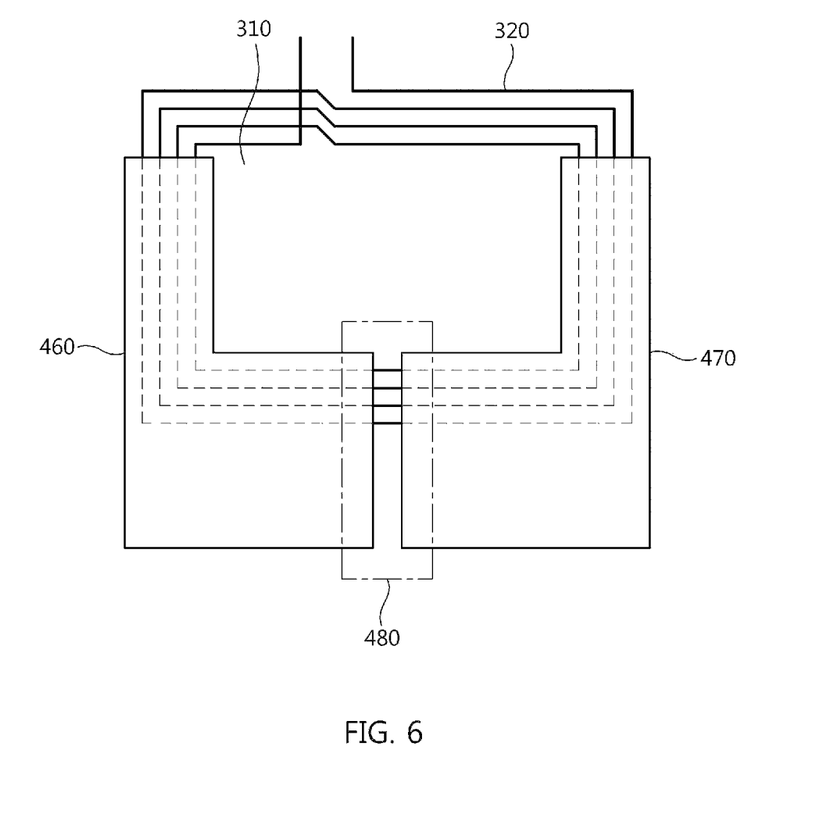

Meanwhile, as shown in FIG. 6, the radiation sheet 400 is composed of a first radiation sheet 460 and a second radiation sheet 470, so that areas that overlap both side patterns (i.e. the left pattern 322 and the right pattern 324) and part of the lower pattern 328 of the radiation pattern 320 may be formed. That is, the radiation sheet 400 includes the first radiation sheet 460 formed in an L-shape while including the first protrusion 420 and part of the base element 440, and the second radiation sheet 470 formed in an inverted L-shape while including the second protrusion 430 and the remaining part of the base element 440. The first radiation sheet 460 forms an area that overlaps the left pattern 322 and partial left portion of the lower pattern 328 of the radiation pattern 320. The second radiation sheet 470 is stacked to be spaced apart from the first radiation sheet 460 by a predetermined distance, and forms an area that overlaps the right pattern 324 and partial right portion of the lower pattern 328 of the radiation pattern 320.

Here, a separation space 480 is formed between the first radiation sheet 460 and the second radiation sheet 470, and part of the lower pattern 328 of the radiation pattern 320 is exposed through the separation space 480. By means of this structure, the radiation sheet 400 acts as an auxiliary radiator for the radiation pattern 320, so that a radiation area is increased, and antenna performance may be maximized thanks to the increase in the radiation area.

Figure 7:
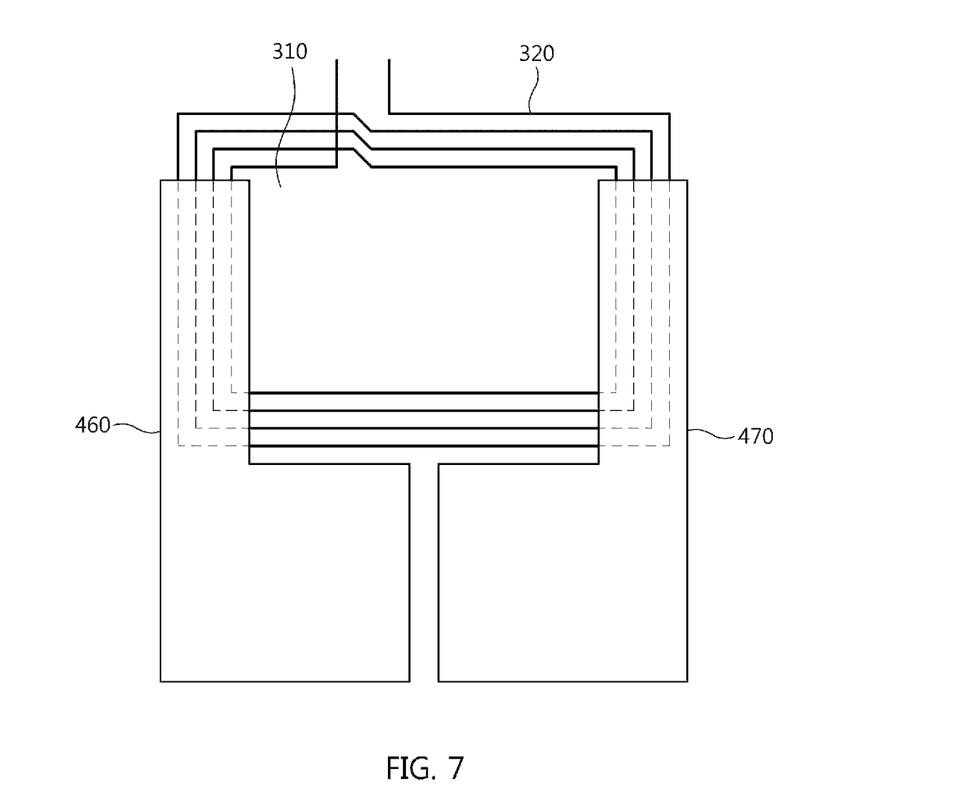

Here, as shown in FIG. 7, the first radiation sheet 460 includes the first protrusion 420 and part of the base element 440, and forms an area that overlaps part of the left pattern 322 of the radiation pattern 320. The second radiation sheet 470 includes the second protrusion 430 and the remaining part of the base element 440, and forms an area that overlaps part of the right pattern 324.

Here, the base element 440 included in the first radiation sheet 460 and the second radiation sheet 470 is formed to be spaced apart from the lower pattern 328, and the separation space 480 is formed between part of the base element 440 included in the first radiation sheet 460 and part of the base element 440 included in the second radiation sheet 470. By means of this structure, the area of the radiation sheet 400 may be reduced while antenna characteristics identical to those of the NFC antenna module, to which the radiation sheet 400 shown in FIG. 5 is applied, may be maintained, thus decreasing the unit cost.

As described above, the NFC antenna module is advantageous in that a radiation sheet made of a metal material is stacked on the top of a radiation pattern to overlap the radiation pattern, so that the radiation from the radiation pattern is also performed through the radiation sheet, thus maximizing antenna performance.

Furthermore, the NFC antenna module is advantageous in that slots are formed in part of the area of the radiation sheet that overlaps the radiation pattern, so that the area of the radiation sheet is reduced while antenna performance is maximized, thus decreasing the unit cost.

Although the preferred embodiments of the present invention have been disclosed for illustrative purposes, those skilled in the art will appreciate that various modifications and changes are possible, without departing from the scope and spirit of the invention as disclosed in the accompanying claims.

What is claimed is:

1. A Near-Field Communication (NFC) antenna module, comprising:
    an electromagnetic shielding sheet;
    an antenna sheet in which a radiation pattern is formed along a peripheral surface of a central part, the antenna sheet being stacked on the electromagnetic shielding sheet; and
    a radiation sheet stacked on the antenna sheet to form an area that overlaps the radiation pattern, the radiation sheet having a depression formed to expose the central part,
    wherein the radiation sheet forms an area that overlaps a left pattern, a right pattern, and a lower pattern of the radiation pattern,
    wherein the radiation sheet comprises:
    a first protrusion formed on a left side of the depression and configured to form an area that overlaps the left pattern of the radiation pattern;
    a second protrusion formed on a right side of the depression and configured to form an area that overlaps the right pattern of the radiation pattern; and
    a base element formed under the depression and configured to form an area that overlaps the lower pattern of the radiation pattern.

2. The NFC antenna module of claim 1, wherein the base element is configured such that one or more slots for exposing part of the lower pattern are formed in the area that overlaps the lower pattern.

3. The NFC antenna module of claim 1, wherein the radiation sheet comprises:
    a first radiation sheet comprising the first protrusion and part of the base element, and forming an area that overlaps the left pattern and the lower pattern of the radiation pattern; and
    a second radiation sheet comprising the second protrusion and remaining part of the base element, and forming an area that overlaps the right pattern and the lower pattern of the radiation pattern.

4. The NFC antenna module of claim 3, wherein the first radiation sheet and the second radiation sheet are spaced apart from each other by a separation space in the area that overlaps the lower pattern, and the lower pattern of the radiation pattern is exposed to outside through the separation space.

5. The NFC antenna module of claim 1, wherein the electromagnetic shielding sheet comprises a ferrite sheet.

6. A portable terminal comprising the NFC antenna module of claim 1.

7. The portable terminal of claim 6, wherein the NFC antenna module is mounted on a battery pack or a rear housing of the portable terminal.

8. A Near-Field Communication (NFC) antenna module, comprising:
    an electromagnetic shielding sheet;
    an antenna sheet in which a radiation pattern is formed along a peripheral surface of a central part, the antenna sheet being stacked on the electromagnetic shielding sheet; and
    a radiation sheet stacked on the antenna sheet to form an area that overlaps the radiation pattern, the radiation sheet having a depression formed to expose the central part,
    wherein the radiation sheet comprises:
    a first protrusion formed on a left side of the depression and configured to form an area that overlaps a left pattern of the radiation pattern;

a second protrusion formed on a right side of the depression and configured to form an area that overlaps a right pattern of the radiation pattern; and a base element formed under the depression, and configured to expose a lower pattern of the radiation pattern.

9. The NFC antenna module of claim 8, wherein the radiation sheet comprises:

a first radiation sheet comprising the first protrusion and part of the base element, and forming an area that overlaps the left pattern of the radiation pattern; and a second radiation sheet comprising the second protrusion and remaining part of the base element, and forming an area that overlaps the right pattern of the radiation pattern, wherein the first and second radiation sheets are spaced apart from each other.

* * * * *